(12) United States Patent
Zhou

(10) Patent No.: US 10,319,119 B2
(45) Date of Patent: Jun. 11, 2019

(54) METHODS AND SYSTEMS FOR ACCELERATED READING OF A 3D MEDICAL VOLUME

(71) Applicant: Siemens Healthcare GmbH, Erlangen (DE)

(72) Inventor: Shaohua Kevin Zhou, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 205 days.

(21) Appl. No.: 15/063,815

(22) Filed: Mar. 8, 2016

(65) Prior Publication Data

US 2017/0263023 A1   Sep. 14, 2017

(51) Int. Cl.
 *G06T 11/00* (2006.01)
 *G06T 19/00* (2011.01)

(52) U.S. Cl.
 CPC ............ *G06T 11/008* (2013.01); *G06T 19/00* (2013.01); *G06T 2210/41* (2013.01)

(58) Field of Classification Search
 None
 See application file for complete search history.

(56) References Cited

U.S. PATENT DOCUMENTS

| | | | | |
|---|---|---|---|---|
| 5,987,345 A * | 11/1999 | Engelmann | ........... | G06F 19/321 600/407 |
| 6,222,557 B1 * | 4/2001 | Pulley, IV | ............ | G06T 11/206 345/622 |
| 8,073,220 B2 * | 12/2011 | Khamene | ................ | G06T 7/149 382/128 |
| 8,090,180 B2 * | 1/2012 | Maier | .................. | G06K 9/4638 382/131 |
| 8,131,038 B2 * | 3/2012 | Saddi | ................... | G06K 9/6209 382/128 |
| 8,577,130 B2 | 11/2013 | Dewan et al. | | |
| 8,718,341 B2 * | 5/2014 | Buelow | ................ | G06T 7/0012 128/922 |
| 8,837,771 B2 * | 9/2014 | Lay | .......................... | G06K 9/34 378/4 |
| 8,989,471 B2 | 3/2015 | Wu et al. | | |
| 9,042,620 B2 * | 5/2015 | Kohlberger | ......... | G06K 9/6209 382/131 |
| 2003/0139834 A1 * | 7/2003 | Nikolskiy | ............ | G06F 19/321 700/98 |
| 2004/0022424 A1 * | 2/2004 | Seissler | ................... | G06T 19/20 382/128 |
| 2005/0251036 A1 * | 11/2005 | Abuhamad | .............. | A61B 8/08 600/437 |
| 2007/0183558 A1 * | 8/2007 | Hempel | ............ | A61B 5/02007 378/4 |

(Continued)

*Primary Examiner* — Yu Chen

(57) ABSTRACT

Methods and apparatus for automatically visualizing 3D medical image data to provide accelerated reading of the 3D medical image data are disclosed. A 3D medical volume is received. A synopsis volume or a tapestry image is generated from the 3D medical volume. A synopsis volume is a spatially compact volume that is created from the 3D medical image volume and contains target anatomical structures related to a particular clinical task. A tapestry image is a single 2D image that visualizes a combination of multiple 2D views of one or more target anatomical objects related to a particular clinical task.

22 Claims, 7 Drawing Sheets

(56) References Cited

U.S. PATENT DOCUMENTS

| | | | |
|---|---|---|---|
| 2007/0249910 | A1 | 10/2007 | Kiraly et al. |
| 2007/0276214 | A1* | 11/2007 | Dachille ............... G06T 7/0012 600/407 |
| 2008/0248443 | A1* | 10/2008 | Chishti .................... A61C 7/00 433/24 |
| 2010/0080434 | A1 | 4/2010 | Seifert et al. |
| 2012/0070155 | A1 | 3/2012 | Wieland et al. |
| 2012/0230572 | A1* | 9/2012 | Kohlberger .......... G06K 9/6209 382/131 |
| 2015/0262422 | A1* | 9/2015 | Znamenskiy ............. G06T 7/60 345/420 |
| 2015/0379744 | A1 | 12/2015 | Kretschmer et al. |
| 2016/0193014 | A1* | 7/2016 | Morton .................... A61C 7/08 433/6 |

\* cited by examiner

METHODS AND SYSTEMS FOR ACCELERATED READING OF A 3D MEDICAL VOLUME

BACKGROUND OF THE INVENTION

The present invention relates to visualization of 3D medical image data, and more particularly, to automated visualization of 3D medical image data to provide accelerated reading of the 3D medical image data.

Reading medical image data stored in a 3D volume, such as a computed tomography (CT) volume, magnetic resonance (MR) volume, dynaCT volume, etc., is a challenging and time-consuming task. This is due, in part to, the fact that humans are used to reading 2D images. Hence, a 3D volume typically must be sliced or cut into 2D images for reading by a user. Furthermore, high information density of 3D volumes leads to further challenges. As 3D medical imaging scanners become more advanced, a large number of slices (e.g., 1000+ slices) may be acquired, thereby creating a pressing information burden to users who are attempting to read and interpret a 3D medical volume. In addition, a 3D medical image volume may contain unnecessary information. For specific clinical applications, not all slices of a 3D medical volume are useful and within a useful slice, not all voxels are useful. However, image reading systems will typically present all of the information contained in a 3D medical image, leaving the user to manually sort the useful information from the unnecessary information.

BRIEF SUMMARY OF THE INVENTION

The present invention provides methods and systems for automated visualization of 3D medical image data to provide accelerated reading of the 3D medical image data. Embodiments of the present invention detect important information in a 3D medical volume for a particular clinical task and automatically reformat the 3D medical volume to visualize the important information included in the 3D medical volume in a compact manner.

In one embodiment of the present invention, a 3D medical volume is received. A plurality of target anatomical structures are segmented in the 3D medical image volume. A synopsis volume that is a spatially compact volume including the segmented plurality of target anatomical structures is automatically generated. The synopsis volume is displayed.

In another embodiment of the present invention, a 3D medical volume is received. A plurality of relevant 2D views of at least one target anatomical object in the 3D medical volume are detected. A 2D tapestry image that visualizes a combination of the plurality of relevant 2D views of the at least one target anatomical object is automatically generated. The 2D tapestry image is displayed.

These and other advantages of the invention will be apparent to those of ordinary skill in the art by reference to the following detailed description and the accompanying drawings.

DETAILED DESCRIPTION

The present invention relates to methods and systems for automated visualization of 3D medical image data to provide accelerated reading of the 3D medical image data. Embodiments of the present invention are described herein to give a visual understanding of the method for automated visualization of 3D medical image data. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
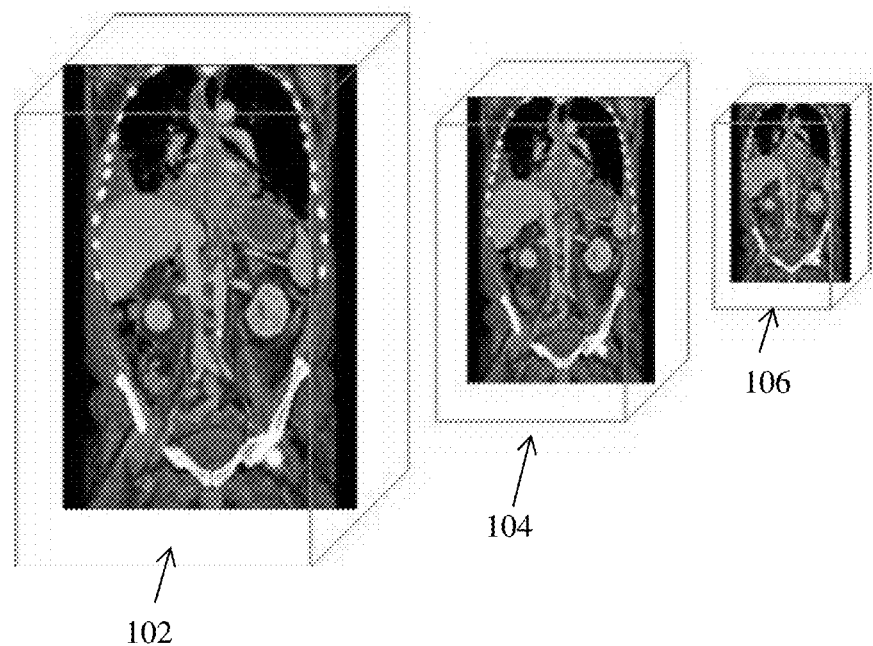
FIG. 1 illustrates an example of a hierarchical display of a 3D medical volume.

Reading a medical image stored in a 3D volume is typically a challenging and time consuming task. Various techniques can be used to overcome the challenges in reading 3D medical image data and accelerate the reading workflow. Some techniques convert the 3D reading to 2D reading in order to accommodate users' preferences for reading 2D images instead of 3D images. The challenge with such techniques is how to create a 2D visualization of the 3D medical image data so that the information is maximally displayed. Examples of techniques for converting a 3D volume to a 2D visualization include multi-planar reconstruction (MPR), curved MPR, maximum intensity projection (MIP), digital reconstruction radiograph (DRR) or virtual X-ray, and volume rendering (VR). Other techniques harness information density in the 3D volume to attempt to present the 3D medical image data to the user in such a way that the user is not overwhelmed and navigation of the 3D medical image data can be easily performed. For example, a hierarchical visualization can be used that allows a user to control the resolution he or she wants to view. In a possible implementation, a various resolutions of a medical volume can be displayed simultaneously or sequential on a display device. A user can browse a low-resolution visualization to look for potential findings of interest. Once a potential finding is identified, the user can further browse high-resolution visualizations to observe the location of the potential finding in greater detail. FIG. 1 illustrates an example of a hierarchical display of a 3D medical volume. As shown in FIG. 1, the 3D medical volume is displayed at various resolutions 102, 104, and 106. Other techniques focus on presenting necessary information in a 3D medical volume. For example, reading of a 3D medical volume can be performed using structure reading, in which a workflow navigation plane is displayed to allow the user to select among different anatomies for view and reading.

Figure 2:
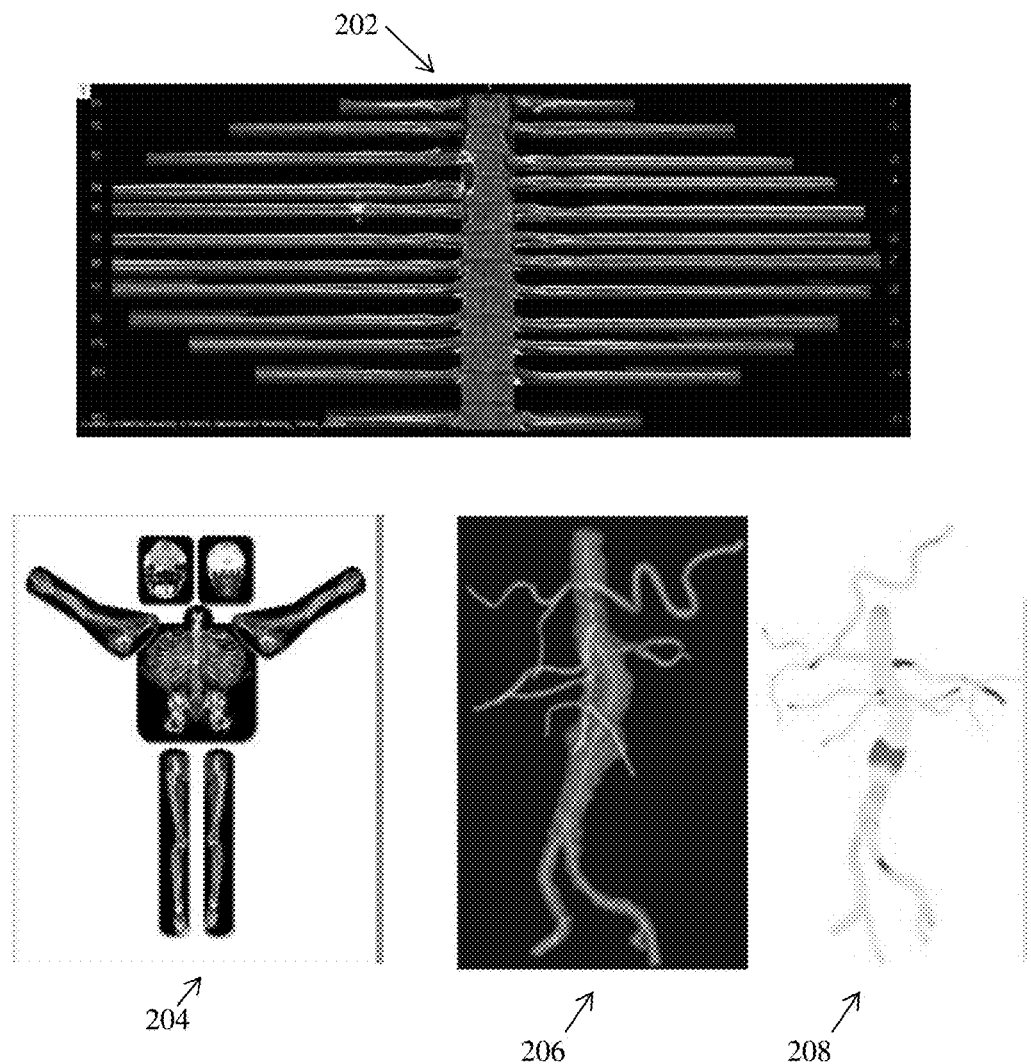
FIG. 2 illustrates examples of rib unfolding, human skeleton unfolding, and vessel tree unfolding.

Anatomy unfolding is a recently proposed hybrid method for efficient visualization and reading of a 3D medical volume. An unfolding image is a 2D summary of a 3D volume. For example, in rib unfolding, a 2D image is generated to present all ribs by unfolding 3D ribs into 2D, thereby converting a 3D reading task into 2D. Other information in the 3D volume that is unnecessary to rib reading is disregarded. Similar unfolding techniques can be applied for the human skeleton and for blood vessels. FIG. 2 illustrates examples of rib unfolding, human skeleton unfolding, and vessel tree unfolding. As shown in FIG. 2, image 202 is a 2D image generated from a 3D medical volume using rib unfolding, image 204 is a 2D image generated from a 3D medical volume using skeleton unfolding, and image 206 and 208 are 2D images generated from a 3D medical volume using vessel tree unfolding.

Embodiments of the present invention provide fully automated hybrid methods for visualizing image data in a 3D medical volume. In one embodiment, a synopsis volume specific to a certain clinical task is generated for a 3D medical image volume. The synopsis volume is a spatially compact volume that is created from the 3D medical image volume and contains target anatomical structures related to a particular clinical task. In another embodiment, a tapestry image specific to a certain clinical task is generated for a 3D medical volume. The tapestry image is a single 2D image that visualizes a combination of multiple 2D views of one or more target anatomical objects related to a particular clinical task.

Figure 3:
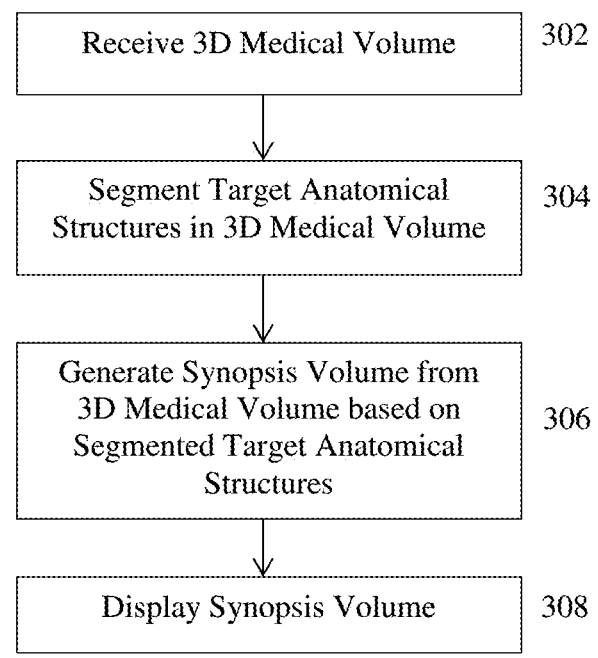
FIG. 3 illustrates a method of automatically visualizing 3D medical image data to provide accelerated reading of the 3D medical image data according to an embodiment of the present invention.

FIG. 3 illustrates a method of automatically visualizing 3D medical image data to provide accelerated reading of the 3D medical image data according to an embodiment of the present invention. The method of FIG. 3 transforms a received 3D medical volume to generate and display a synopsis volume that is a spatially compact volume containing target anatomical structures related to a particular clinical task. At step 302, a 3D medical volume is received. The 3D medical volume can be acquired using any type of 3D medical imaging modality. For example, the 3D medical volume may be a computed tomography (CT) volume, magnetic resonance imaging (MRI) volume, DynaCT volume, positron emission tomography (PET) volume, 3D ultrasound volume, etc. The 3D medical volume may be received directly from an image acquisition device used to acquire the 3D medical volume, such as a CT scanner, MRI scanner, C-arm image acquisition device, etc. Alternatively, the 3D medical image volume may be received by loading a stored 3D medical image volume from a storage or memory system of a computer or by receiving a 3D medical image volume transmitted from a remote computer system or database.

At step 304, target anatomical structures are segmented in the 3D medical volume. The target anatomical structures are predetermined anatomical structures that are relevant for a particular clinical task. For example, in a certain clinical task, such as reading a 3D medical volume to find or observe lesions, a user may be interested in viewing the liver and kidneys in the 3D medical volume. Accordingly, in an exemplary embodiment, the liver and kidneys can be the target anatomical structures that are segmented in the 3D medical image volume. However, the present invention is not limited thereto, and other anatomical structures can be segmented depending on the clinical task to be performed. In an advantageous implementation, two or more target anatomical structures are segmented in the 3D medical volume. The target anatomical structures (e.g., liver, kidneys, etc.) can be segmented using any automated or semi-automated segmentation technique. For example, the target anatomical structures may be segmented using machine learning based segmentation techniques, graph cuts segmentation, region-growing segmentation, random walker segmentation, and/or any other type of segmentation technique. Various methods for organ segmentation in a 3D medical volume are described in detail in U.S. Pat. Nos. 9,042,620, 8,073,220, 8,557,130, 8,837,771, 8,090,180, 8,131,038, 7,916,919, and U.S. Publication No. 2010/0080434, the disclosures of which are incorporated herein by reference in their entirety.

In exemplary implementation, Marginal Space Learning (MSL) can be used to automatically segment each of the target anatomical structures (e.g., liver, kidneys, etc.) MSL-based 3D object detection estimates the position, orientation, and scale of a target anatomical structure in the 3D medical image data using a series of detectors trained using annotated training data. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. The 3D object detection is split into three steps: object position estimation, position-orientation estimation, and position-orientation-scale estimation. A separate machine learning classifier is trained based on annotated training data for each of these steps. For example, separate probabilistic boosting tree (PBT) classifiers can be trained for position estimation, position-orientation estimation, and position-orientation-scale estimation. This object localization stage results in an estimated transformation (position, orientation, and scale) of the object, and a mean shape of the object (i.e., the mean shape of the target anatomical object the annotated training images) is aligned with the 3D volume using the estimated transformation. After the object pose estimation, the boundary of the object is refined using a learning based boundary detector. MSL-based 3D object detection is described in detail in U.S. Pat. No. 7,916,919, entitled "System and Method for Segmenting Chambers of a Heart in a Three Dimensional Image", which is incorporated herein by reference.

At step 306, a synopsis volume is generated from the 3D medical volume based on the segmented target anatomical structures. The synopsis volume is a spatially compact volume, as compared to the initial 3D medical image volume, that contains the segmented target anatomical structures. In the synopsis volume, the target anatomical structures are shifted relative to one another to fit the target anatomical structures in a reduced amount of 3D space. The synopsis volume can include only the segmented target anatomical structures or the segmented anatomical structures and some additional image data surrounding the target anatomical structures in the 3D medical image.

Figure 4:
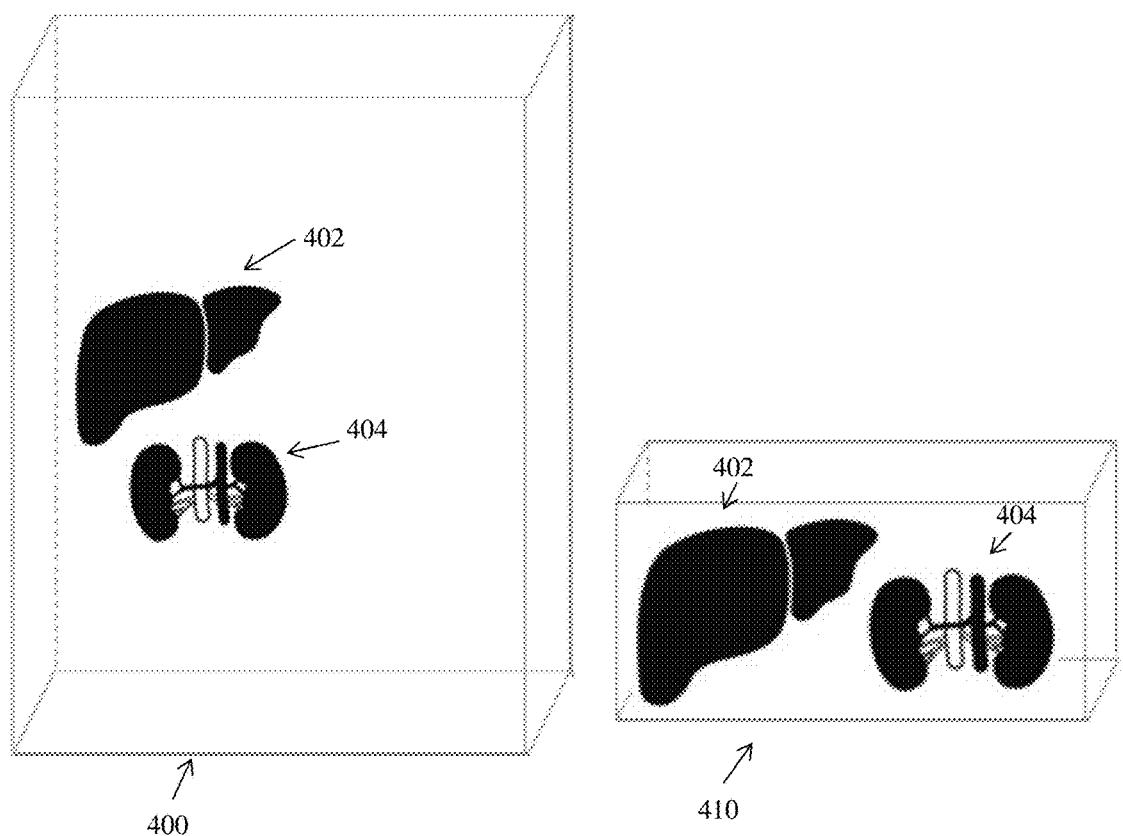
FIG. 4 illustrates generating a synopsis volume containing the liver and the kidneys according to an exemplary embodiment of the present invention.

In an exemplary embodiment in which the liver and the kidneys are the target anatomical structures for a certain clinical task, the user is interested in viewing the liver and kidneys from the 3D medical volume. FIG. 4 illustrates generating a synopsis volume containing the liver and the kidneys according to an exemplary embodiment of the present invention. As shown in FIG. 4, image 400 shows an original 3D volume, which is a large volume having a size (X*Y*Z), in image 410 shows a synopsis volume, which is a spatially compact volume having a size (a*b*c). Since the liver 402 sits at a level higher than the kidneys 404 in the original 3D volume 400, the viewing of the liver 402 and the kidneys 404 in the original 3D volume 400 would have to be done in a sequential manner. However, in the generated synopsis volume 410, the liver 402 and kidneys 404 are artificially positioned side-by-side. Only the image information corresponding to the segmented liver 402 and kidneys 404, and possible image information in a vicinity of the segmented liver 402 and kidneys 404 are used in the synopsis volume 410. According to an advantageous implementation, the image information within and in the vicinity of the liver 402 and kidneys 404 is exactly preserved from the original 3D volume 400 in the synopsis volume 410, so that all necessary information is provided in the generated synopsis volume 410. The synopsis volume 410 is spatially compact, as compared to the original 3D volume 400. The size (a*b*c) of the synopsis volume 410 is much smaller than the original volume size (X*Y*Z), as it is likely that a<X, b<Y, and c<<Z.

A method for generating the synopsis volume according to an exemplary embodiment is described as follows. A plurality of target anatomical structures are segmented in the 3D medical volume in step 304 of FIG. 3. A respective bounding box is determined for each of the segmented anatomical structures in the 3D medical volume. If MSL-based object detection is used to segment the target anatomical structures, the bounding box for each target anatomical structure will be known from the segmentation step. Otherwise, the bounding boxes can be defined based on the segmented target anatomical structures. In a possible implementation, the bounding box for each target anatomical structure can be defined as a bounding box centered at the center of mass of the segmented structure and having an orientation and scale such that the entire segmented structure is encompassed in the smallest possible bounding box. In a possible implementation, each bounding box defines a region of interest for the corresponding target structure. In another possible implementation, each bounding box is expanded by a predetermined amount in each direction, and the region of interest for each target anatomical structure is defined by the expanded bounding box, such that the region of interest for each target anatomical structure includes voxels in a predetermined neighborhood of the segmented target anatomical structure. The regions of interest for the segmented target anatomical structures are then aligned to generate a spatially compact synopsis volume. For example, the regions of interest can be aligned horizontally (as shown in FIG. 4), vertically, diagonally, or in a predetermined pattern, such as a square pattern. In a possible implementation, the regions of interest may be aligned in a predetermined pattern corresponding to a specific clinical task to be performed. In another possible implementation, the regions of interest may be aligned using an optimization technique to determine an optimal alignment resulting in the most compact synopsis volume (i.e., a synopsis volume with the smallest total size). In this case, the regions of interest are essentially treated as puzzle pieces which are automatically pieced together to form the synopsis volume. In generating the synopsis volume, the original image data (i.e., voxel intensities) inside each region of interest is preserved from the original 3D medical volume, but the regions of interest are re-positioned with respect to each other to generate a denser and more compact volume. Once the regions of interest are repositioned to generate the synopsis volume, the synopsis volume can be processed to smooth boundaries between the regions of interest corresponding to different target anatomical structures. For example, voxels intensities can be interpolated along boundaries between the pieced together regions of interest so that transitions between the regions of interest are smooth in the synopsis volume.

Returning to FIG. 3, at step 308, the synopsis volume is displayed on a display device. For example, a 3D visualization of the synopsis volume and/or various 2D slices of the synopsis volume can be displayed on the display device. The user can then navigate the displayed synopsis volume using a user input device, such as a mouse, touch screen, etc. In a possible implementation, the original received 3D medical volume can be displayed as well, and when the user selects a particular voxel in the synopsis volume, the corresponding location in the original 3D medical volume can be highlighted or marked as well.

Figure 5:
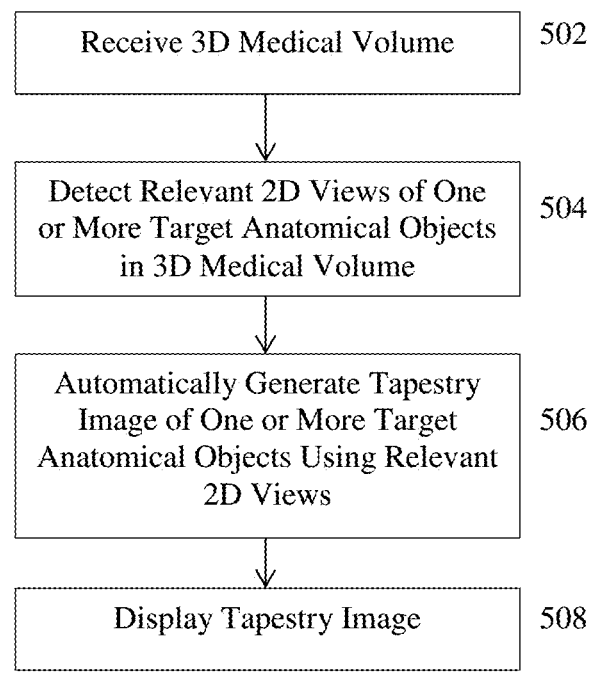
FIG. 5 illustrates a method of automatically visualizing 3D medical image data to provide accelerated reading of the 3D medical image data according to another embodiment of the present invention.

FIG. 5 illustrates a method of automatically visualizing 3D medical image data to provide accelerated reading of the 3D medical image data according to another embodiment of the present invention. The method of FIG. 5 transforms a received 3D medical volume to generate and display a tapestry image that is a 2D image that visualizes a combination of multiple 2D views of one or more target anatomical objects related to a particular clinical task. At step 502, a 3D medical volume is received. The 3D medical volume can be acquired using any type of 3D medical imaging modality. For example, the 3D medical volume may be a computed tomography (CT) volume, magnetic resonance imaging (MRI) volume, DynaCT volume, positron emission tomography (PET) volume, 3D ultrasound volume, etc. The 3D medical volume may be received directly from an image acquisition device used to acquire the 3D medical volume, such as a CT scanner, MRI scanner, C-arm image acquisition device, etc. Alternatively, the 3D medical image volume may be received by loading a stored 3D medical image volume from a storage or memory system of a computer or by receiving a 3D medical image volume transmitted from a remote computer system or database.

At step 504, a plurality of relevant 2D views of one or more target anatomical objects are detected in the 3D medical volume. One or more target anatomical objects of interest are detected in the 3D medical volume. For example, a target anatomical structure, such as an organ (e.g., liver, lungs, heart, brain, prostate, etc.), vessel, or bone structure, can be detected in the 3D medical volume. Other anatomical objects, such as lesions, nodules, or anatomical landmarks, can also be detected as the anatomical object of interest. One the one or more anatomical objects of interest are detected, a plurality of relevant 2D views of the anatomical object(s) of interest are automatically detected in the 3D medical volume.

In an exemplary embodiment, an organ is the anatomical object of interest. For example, the liver can be the anatomical object of interest for a clinical task of liver lesion detection and/or observation. Although the example describe herein uses the liver as the anatomical object of interest, the present invention is not limited thereto, and the description can be similarly applied to other organs or anatomical structures. The liver is segmented in the 3D medical volume. Various methods segmenting the liver and/or other organs in a 3D medical volume are described in detail in U.S. Pat. Nos. 9,042,620, 8,073,220, 8,557,130, 8,837,771, 8,090,180, 8,131,038, 7,916,919, and U.S. Publication No. 2010/0080434, the disclosures of which are incorporated herein by reference in their entirety. In an exemplary implementation, the liver can be segmented using MSL-based 3D object detection. Based on the liver segmentation results, liver regions of interest can then be cropped in all 2D slices of the 3D medical volume. This provides an overall set of 2D views of the liver from which to generate the tapestry image. A set of relevant 2D views can then be selected from the overall set of 2D views. In a possible implementation, the relevant 2D views can be selected from the overall set of 2D views using a predetermined sampling pattern. For example, for 2D views cropped from each type of 2D slice (i.e., axial, coronal, and sagittal) a predetermined number of slices can be skipped between each selected 2D view. In another possible implementation, substructures can be detected in each of the 2D views and the set of relevant 2D views can be selected based on the substructures detected in the 2D views. For example, vessels within each 2D view of the liver can be used to select the most relevant 2D views. In a possible implementation, a vesselness classifier can be trained based on annotated training data. For example, the vesselness classifier may be trained using a probabilistic boosting tree (PBT) classifier. The trained vesselness classifier is constrained to the pixels in each 2D view of the liver (i.e., each liver region of interest) and calculates, for each pixel, the probability of that pixel belonging to a vessel. An overall vesselness score can be determined for each 2D view based on the vesselness probabilities of the pixels within that 2D view. A predetermined number of 2D views from each type of slice having the highest vesselness scores can then be selected as the set of relevant 2D views. It can be noted that in embodiments in which the lung is the anatomical object of interest, airways can similarly be used as a substructure that provides a basis for selection of the set of relevant 2D views of the lung.

In another exemplary embodiment, other anatomical objects or landmarks, such liver lesions, lung nodules, rib abnormalities, or other types of lesions, tumors, or abnormalities, can be used as the anatomical objects of interests. For example, multiple liver lesions can be used as the anatomical objects of interest to generate a tapestry image that provides an accelerated visualization of the liver lesions. Although the example describe herein uses liver lesions as the anatomical objects of interest, the present invention is not limited thereto, and the description can be similarly applied to other types lesions, tumors, abnormalities, or anatomical landmarks. The liver lesions are detected in the 3D medical volume. For example, a trained machine learning based classifier (e.g., a PBT classifier) can be used to detect liver lesions in the 3D medical volume. A method for detecting liver lesions is described in greater detail in U.S. Publication No. 2012/0070055, the disclosure of which is incorporated herein by reference in its entirety. Predetermined 2D views of all the detected liver lesions can then be selected as the relevant views. In an advantageous implementation, the axial views of all detected liver lesions are used as the relevant 2D views.

At step 506, a tapestry image of the one or more target anatomical objects is automatically generated using the relevant 2D views. The tapestry image is a single 2D image that visualizes a combination of multiple 2D views of one or more target anatomical objects. The tapestry image is automatically generated by combining the set relevant 2D views into a single 2D image. The relevant 2D views are combined in a meaningful order for the particular clinical task to generate a visually pleasing visualization of the relevant 2D views of the one or more target anatomical objects. Different from other visualization techniques that reformat the 3D image into a 2D image, tapestry image uses the actual 2D views extracted from slices of the 3D medical volume and automatically combines multiple relevant 2D views into a single tapestry image. For example, the relevant 2D views can be organized based on the relative positions of the 2D views in the original 3D medical volume. The relevant 2D views can be organized based on the type of view (i.e., the type of slice from which each view from cropped) and organized in a predetermined order for each type of 2D view. For example, depending on the type of 2D view, the relevant 2D views can be displayed in a left to right order, a top to bottom order, or a front to back order. In cases in which a substructure was used as a basis for selecting the relevant 2D views, the relevant 2D views can be organized based on the amount of the substructure within each relevant 2D view. For example, in an embodiment in which a vesselness score is calculated for each relevant 2D view of the liver, the relevant 2D views of the liver can be ordered from highest vesselness score to lowest vesselness score. In cases in which machine learning based detection is used to detect lesions or anatomical landmarks in the 3D medical volume, the 2D views corresponding to the various lesions or landmarks can be organized based on the machine learning classifier scores. For example, in an embodiment in which a tapestry image is generated for multiple liver lesions detected in the 3D medical volume, the axial views of each detected lesion can be organized in order of probability scores calculated by the trained liver lesion classifier for each detected lesion. Alternatively, the axial views of the detected liver lesions can be organized based on the relative positions of the liver lesions in the 3D volume. The relevant 2D views of the target anatomical objects may also be organized using other predetermine patterns that are specific to particular clinical tasks.

Figure 6:
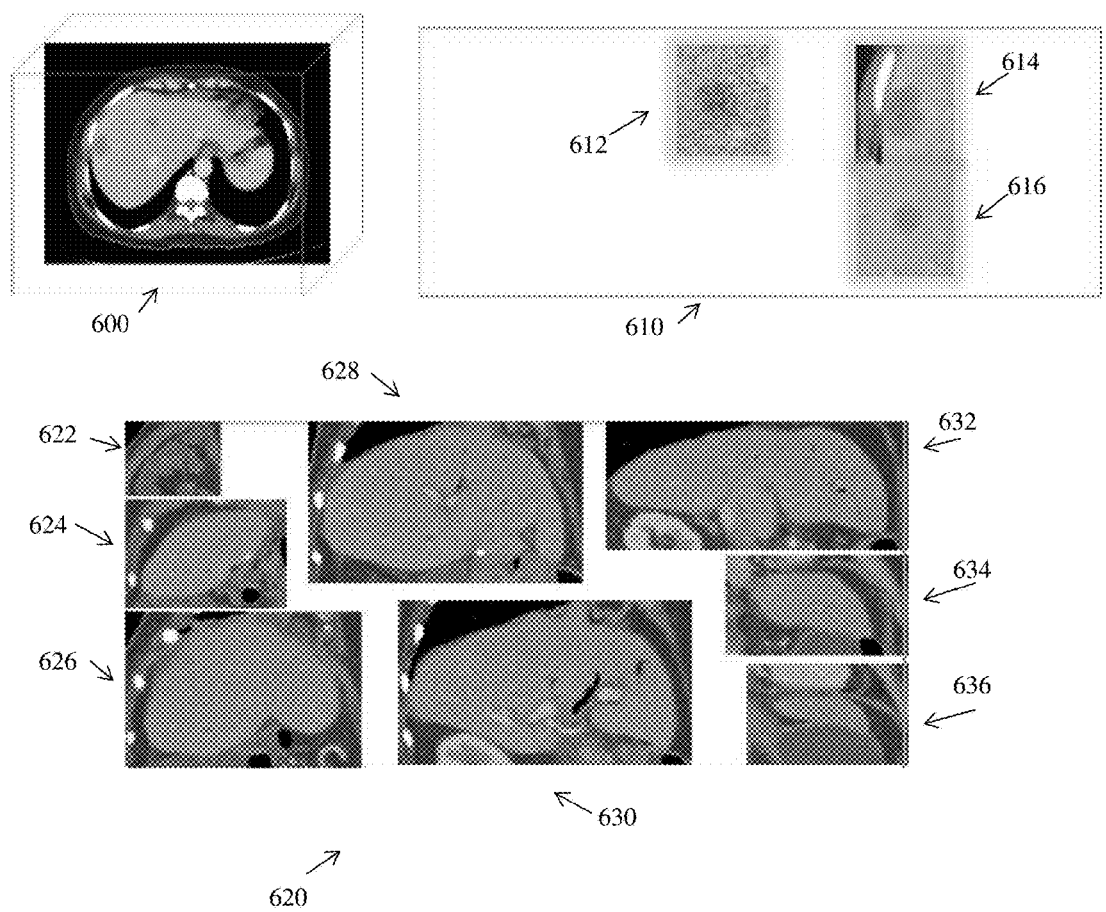
FIG. 6 illustrates exemplary tapestry images generated from a 3D medical volume.

FIG. 6 illustrates exemplary tapestry images generated from a 3D medical volume. As shown in FIG. 6, image 600 shows an original 3D volume. Image 610 shows a liver lesion tapestry image. The liver lesion tapestry image 610 includes axial views 612, 614, and 616 of three liver lesions detected in the original 3D volume 600. Image 620 shows a liver tapestry image. The liver tapestry image 620 includes a set of relevant liver slices 622, 624, 626, 628, 630, 632, 634, and 636.

Returning to FIG. 5, at step 508, the tapestry image is displayed on a display device. The user can then navigate the displayed tapestry image using a user input device, such as a mouse, touch screen, etc. The geometrical relationship between each pixel of the tapestry image and its corresponding originating voxel in the original 3D medical volume is completely known and stored in memory or storage of a computer system associated with the display device. This allows a user to link back and forth between the 3D tapestry image and the 3D medical volume and efficiently navigate the 3D volume using the 2D tapestry image. For example, in a possible implementation, the original received 3D medical volume can be displayed as well, and when the user selects a particular pixel in the tapestry image, the corresponding location in the original 3D medical volume can be highlighted or marked and the visualization of the 3D medical volume can be adjusted to provide a view of the corresponding location.

Figure 7:
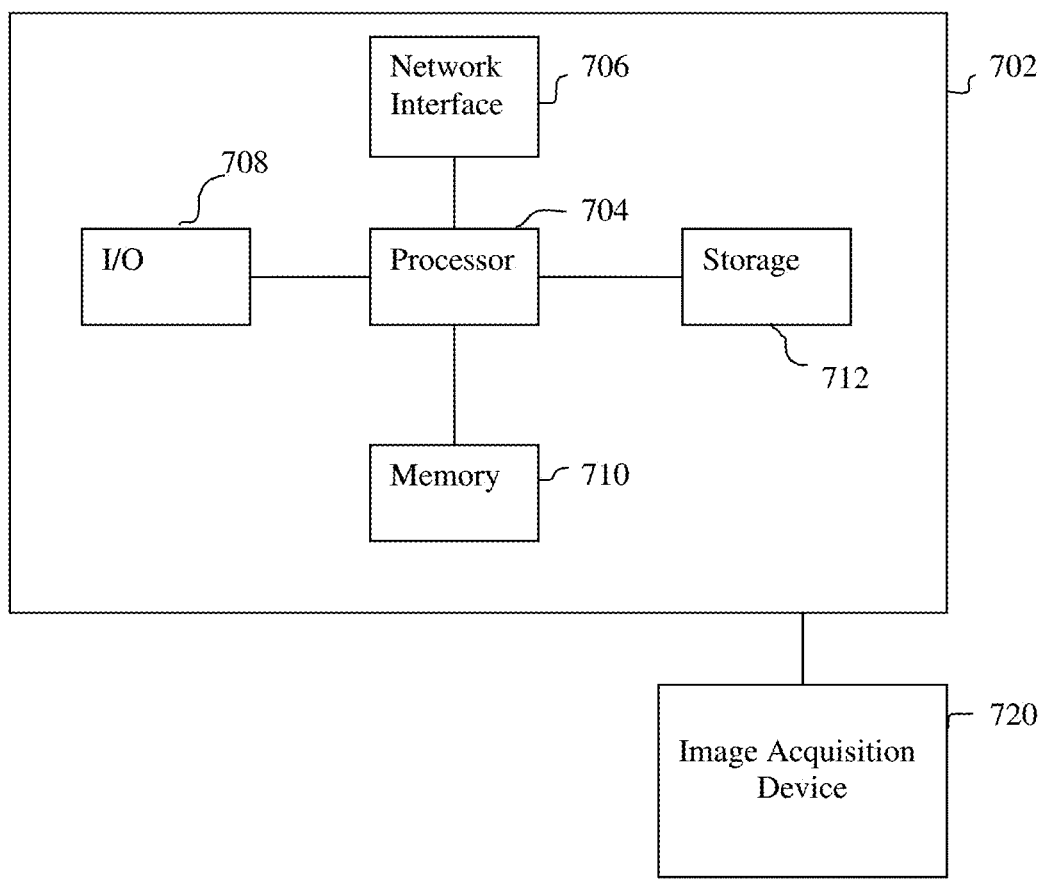
FIG. 7 is a high-level block diagram of a computer capable of implementing the present invention.

The above-described methods for automatically visualizing 3D medical image data to provide accelerated reading of the 3D medical image data may be implemented on a computer using well-known computer processors, memory units, storage devices, computer software, and other components. A high-level block diagram of such a computer is illustrated in FIG. 7. Computer 702 contains a processor 704, which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the steps of the methods of FIGS. 3 and 5 may be defined by the computer program instructions stored in the memory 710 and/or storage 712 and controlled by the processor 704 executing the computer program instructions. An image acquisition device 720, such as an MR scanning device or a CT scanning device, can be connected to the computer 702 to input image data to the computer 702. It is possible to implement the image acquisition device 720 and the computer 702 as one device. It is also possible that the image acquisition device 720 and the computer 702 communicate wirelessly through a network. In a possible embodiment, the computer 702 can be located remotely with respect to the image acquisition device 720 and the some or all of the method steps described herein can be performed as part of a server or cloud based service. In this case, the method steps may be performed on a single computer or distributed between multiple networked and/or local computers. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.). One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for automatically visualizing 3D medical image data to provide accelerated reading of the 3D medical image data, comprising:
   receiving a 3D medical volume;
   segmenting a plurality of target anatomical structures in the 3D medical volume;
   automatically generating a synopsis volume including the segmented plurality of target anatomical structures by repositioning the segmented plurality of target anatomical structures with respect to each other to minimize a size of the synopsis volume; and
   displaying the synopsis volume.

2. The method of claim 1, wherein the segmented plurality of target anatomical structures are repositioned with respect to each other in the synopsis volume such that relative positions of the segmented plurality of target anatomical structures are different in the synopsis volume as compared to the 3D medical volume.

3. The method of claim 1, wherein automatically generating a synopsis volume including the segmented plurality of target anatomical structures by repositioning the segmented plurality of target anatomical structures with respect to each other to minimize a size of the synopsis volume comprises:
   defining a plurality of regions of interest in the 3D medical volume, each of the plurality of regions of interest corresponding to a respective one of the segmented plurality of target anatomical structures; and
   generating the synopsis volume by aligning the plurality of regions of interest into a spatially compact volume having a reduced size as compared to the 3D medical volume, wherein voxels outside of the plurality of regions of interest in the 3D medical volume are not included in the synopsis volume.

4. The method of claim 3, wherein generating the synopsis volume by aligning the plurality of regions of interest into a spatially compact volume having a reduced size as compared to the 3D medical volume comprises:
   horizontally or vertically aligning the plurality of regions of interest in the synopsis volume.

5. The method of claim 3, wherein defining a plurality of regions of interest in the 3D medical volume, each of the plurality of regions of interest corresponding to a respective one of the segmented plurality of target anatomical structures comprises:
   for each of the plurality of regions of interest, defining the region of interest as a set of voxels included in the corresponding segmented target anatomical structure.

6. The method of claim 3, wherein defining a plurality of regions of interest in the 3D medical volume, each of the plurality of regions of interest corresponding to a respective one of the segmented plurality of target anatomical structures comprises, for each of the plurality of regions of interest:
   determining a bounding box enclosing the corresponding segmented target anatomical structure in the 3D medical volume, wherein the bounding box enclosing the corresponding segmented target anatomical structure defines the region of interest.

7. The method of claim 3, wherein defining a plurality of regions of interest in the 3D medical volume, each of the plurality of regions of interest corresponding to a respective one of the segmented plurality of target anatomical structures comprises, for each of the plurality of regions of interest:
   determining a bounding box enclosing the corresponding segmented target anatomical structure in the 3D medical volume; and
   expanding the bounding box, wherein the expanded bounding box defines the region of interest.

8. The method of claim 3, wherein generating the synopsis volume by aligning the plurality of regions of interest into a spatially compact volume having a reduced size as compared to the 3D medical volume comprises:
   repositioning the plurality of regions of interest with respect to each other, while preserving voxel intensities within the plurality of regions of interest.

9. The method of claim 3, wherein automatically generating a synopsis volume including the segmented plurality of target anatomical structures by repositioning the segmented plurality of target anatomical structures with respect to each other to minimize a size of the synopsis volume further comprises:
   processing the synopsis volume to smooth boundaries between the aligned plurality of regions of interest in the synopsis volume.

10. The method of claim 3, wherein the plurality of target anatomical structures comprises a liver and kidneys, and generating the synopsis volume by aligning the plurality of regions of interest into a spatially compact volume having a reduced size as compared to the 3D medical volume comprises:

horizontally aligning a first region of interest corresponding to the segmented liver and a second region of interest corresponding to the segmented kidneys in the synopsis volume.

11. An apparatus for automatically visualizing 3D medical image data to provide accelerated reading of the 3D medical image data, comprising:
means for receiving a 3D medical volume;
means for segmenting a plurality of target anatomical structures in the 3D medical volume;
means for automatically generating a synopsis volume including the segmented plurality of target anatomical structures by repositioning the segmented plurality of target anatomical structures with respect to each other to minimize a size of the synopsis volume; and
means for displaying the synopsis volume.

12. The apparatus of claim 11, wherein the segmented plurality of target anatomical structures are repositioned with respect to each other in the synopsis volume such that relative positions of the segmented plurality of target anatomical structures are different in the synopsis volume as compared to the 3D medical volume.

13. The apparatus of claim 11, wherein the means for automatically generating a synopsis volume including the segmented plurality of target anatomical structures by repositioning the segmented plurality of target anatomical structures with respect to each other to minimize a size of the synopsis volume comprises:
means for defining a plurality of regions of interest in the 3D medical volume, each of the plurality of regions of interest corresponding to a respective one of the segmented plurality of target anatomical structures; and
means for generating the synopsis volume by aligning the plurality of regions of interest into a spatially compact volume having a reduced size as compared to the 3D medical volume, wherein voxels outside of the plurality of regions of interest in the 3D medical volume are not included in the synopsis volume.

14. The apparatus of claim 13, wherein the plurality of target anatomical structures comprises a liver and kidneys, and the means for generating the synopsis volume by aligning the plurality of regions of interest into a spatially compact volume having a reduced size as compared to the 3D medical volume comprises:
means for horizontally aligning a first region of interest corresponding to the segmented liver and a second region of interest corresponding to the segmented kidneys in the synopsis volume.

15. A non-transitory computer readable medium storing computer program instructions for automatically visualizing 3D medical image data to provide accelerated reading of the 3D medical image data, the computer program instructions when executed by a processor cause the processor to perform operations comprising:
receiving a 3D medical volume;
segmenting a plurality of target anatomical structures in the 3D medical volume;
automatically generating a synopsis volume including the segmented plurality of target anatomical structures by repositioning the segmented plurality of target anatomical structures with respect to each other to minimize a size of the synopsis volume; and
displaying the synopsis volume.

16. The non-transitory computer readable medium of claim 15, wherein the segmented plurality of target anatomical structures are repositioned with respect to each other in the synopsis volume such that relative positions of the segmented plurality of target anatomical structures are different in the synopsis volume as compared to the 3D medical volume.

17. The non-transitory computer readable medium of claim 15, wherein automatically generating a synopsis volume including the segmented plurality of target anatomical structures by repositioning the segmented plurality of target anatomical structures with respect to each other to minimize a size of the synopsis volume comprises:
defining a plurality of regions of interest in the 3D medical volume, each of the plurality of regions of interest corresponding to a respective one of the segmented plurality of target anatomical structures; and
generating the synopsis volume by aligning the plurality of regions of interest into a spatially compact volume having a reduced size as compared to the 3D medical volume, wherein voxels outside of the plurality of regions of interest in the 3D medical volume are not included in the synopsis volume.

18. The non-transitory computer readable medium of claim 17, wherein defining a plurality of regions of interest in the 3D medical volume, each of the plurality of regions of interest corresponding to a respective one of the segmented plurality of target anatomical structures comprises, for each of the plurality of regions of interest:
determining a bounding box enclosing the corresponding segmented target anatomical structure in the 3D medical volume, wherein the bounding box enclosing the corresponding segmented target anatomical structure defines the region of interest.

19. The non-transitory computer readable medium of claim 17, wherein defining a plurality of regions of interest in the 3D medical volume, each of the plurality of regions of interest corresponding to a respective one of the segmented plurality of target anatomical structures comprises, for each of the plurality of regions of interest:
determining a bounding box enclosing the corresponding segmented target anatomical structure in the 3D medical volume; and
expanding the bounding box, wherein the expanded bounding box defines the region of interest.

20. The non-transitory computer readable medium of claim 17, wherein generating the synopsis volume by aligning the plurality of regions of interest into a spatially compact volume having a reduced size as compared to the 3D medical volume comprises:
repositioning the plurality of regions of interest with respect to each other, while preserving voxel intensities within the plurality of regions of interest.

21. The non-transitory computer readable medium of claim 17, wherein automatically generating a synopsis volume including the segmented plurality of target anatomical structures by repositioning the segmented plurality of target anatomical structures with respect to each other to minimize a size of the synopsis volume further comprises:
processing the synopsis volume to smooth boundaries between the aligned plurality of regions of interest in the synopsis volume.

22. The non-transitory computer readable medium of claim 17, wherein the plurality of target anatomical structures comprises a liver and kidneys, and generating the synopsis volume by aligning the plurality of regions of interest into a spatially compact volume having a reduced size as compared to the 3D medical volume comprises:

horizontally aligning a first region of interest corresponding to the segmented liver and a second region of interest corresponding to the segmented kidneys in the synopsis volume.

\* \* \* \* \*